United States Patent [19]

Ponte

[11] 4,184,419

[45] Jan. 22, 1980

[54] TOASTER ACCESSORY

[76] Inventor: Raymon Ponte, 16516 Kipling Rd., Rockville, Md. 20855

[21] Appl. No.: 968,420

[22] Filed: Dec. 11, 1978

[51] Int. Cl.$^2$ .............................................. A47J 37/08
[52] U.S. Cl. ......................................... 99/402; 99/339
[58] Field of Search .................... D7/99; 99/339, 402, 99/389, 391, 392, 393

[56] References Cited

U.S. PATENT DOCUMENTS

| | | | |
|---|---|---|---|
| 3,096 | 7/1963 | Cardwell | 99/402 |
| 1,312,616 | 8/1919 | Cowan | 99/402 |
| 2,285,156 | 6/1942 | Gomersall | 99/339 |
| 3,094,061 | 6/1963 | Cole | 99/402 |
| 3,140,651 | 7/1964 | Barnett | 99/392 |
| 3,511,170 | 5/1970 | O'Connor | 99/339 |

FOREIGN PATENT DOCUMENTS 2262502  9/1975  France ...................... 99/402

*Primary Examiner*—Billy J. Wilhite
*Attorney, Agent, or Firm*—Haight & Huard

[57] ABSTRACT

An accessory (1) for holding toast, muffins and other food articles includes two sections (2,3) which are hinged along their bottom edges to form a carrier to be inserted into one slot of a pop-up toaster. The carrier is formed of two complimentary sections, each of which includes a handle (10) of heat resistant material at its top, a metal support plate (12) attached to the underside of the handle, a plurality of support wires (13) attached to the ends of the support plate, and a plurality of guide wires (16) also attached to the support plate intermediate the support wires. Both the guide wires and the support wires have circular loops (21) at their bottom ends so that a hinge (4) can be inserted within and retained by the circular loops. The hinge which is inserted in the circular loops consists of a hollow tubular cylindrical metal member (14) and a pin (15) which is inserted within the tubular member. The accessory is designed to overcome burns and shocks which often result when a consumer attempts to remove a piece of toast or like food from a toaster slot in which it has become wedged by hand or article of silverware. The carrier can be easily inserted within a pop-up toaster slot and withdrawn therefrom, and the handle is provided with finger grooves (11) along the outside portion thereof so as to facilitate the same.

11 Claims, 3 Drawing Figures

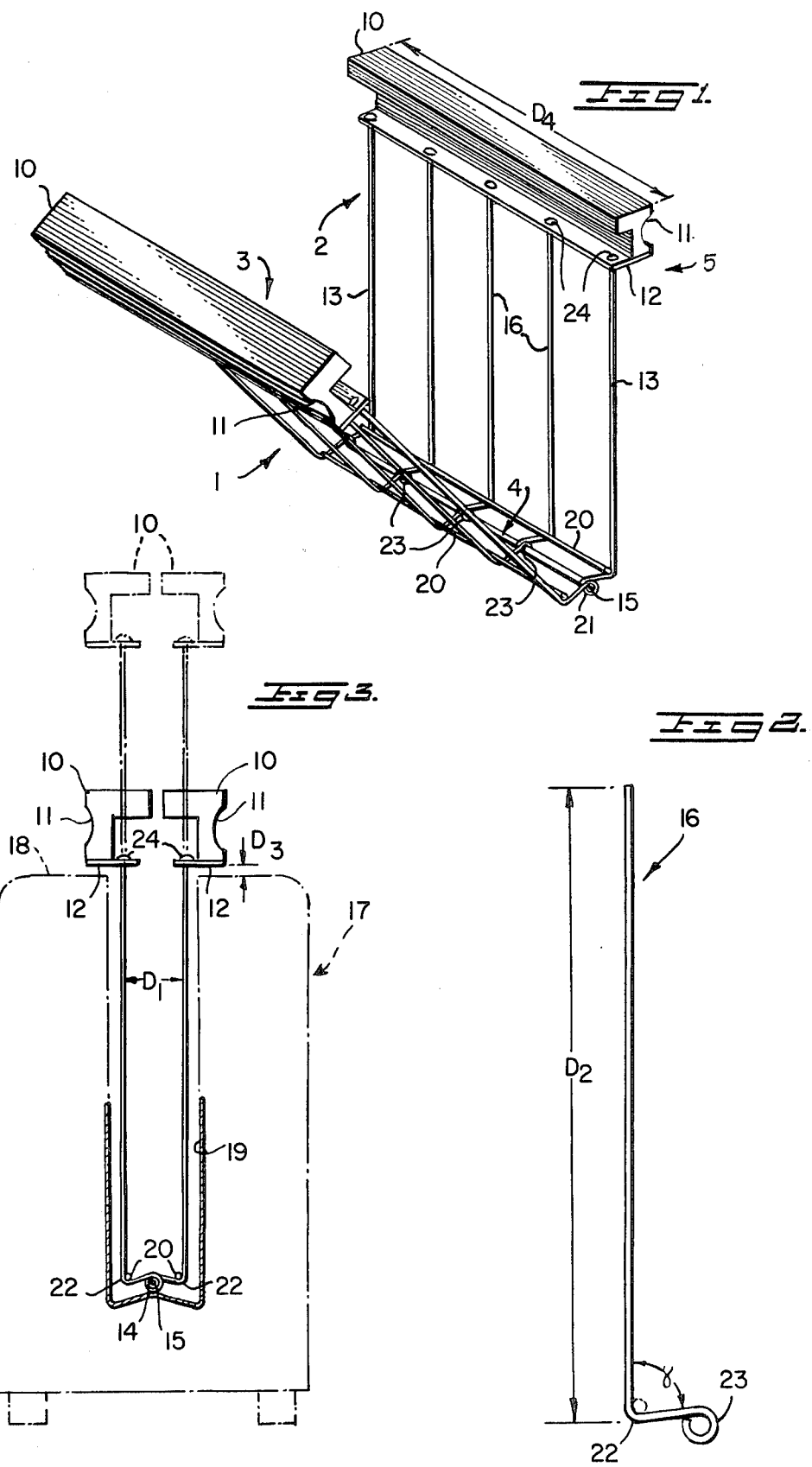

TOASTER ACCESSORY

BACKGROUND OF THE INVENTION

The present invention relates generally to accessories for pop-up toasters, and more particularly to a new and improved accessory carrier for toasting various breads and pastries.

Several problems typically arise when a conventional pop-up toaster is used for toasting bread, muffins, pastries or other similar food articles. One of these problems is that the article being toasted often gets stuck to the heating elements of the toaster and as a result is wedged within one of the toaster slots. This necessitates the insertion of a knife or other elongated object in order to withdraw the toast from the toaster, and this in turn results in an increased possibility of electrical shock to the user and damage to the fragile heating elements. Alternatively, an article of food to be toasted can be removed from a toaster by a consumer by hand. This is also unsatisfactory, as burns, scrapes and cuts often result therefrom. A second major problem with the use of pop-up toasters which results from the contact between the foodstuff and the heating elements is that the food is often burnt and becomes crusty. It is extremely difficult to prevent an article which is being toasted from coming into contact with the heating elements and as a result it will often be inedible after toasting.

Several attempts have been made in the past to overcome the aforementioned problems in conjunction with a pop-up toaster. O'Connor, U.S. Pat. No. 3,511,170, discloses a frame-like toaster accessory designed to broil meat within a toaster. This device, however, requires a bulky frame element which, when a piece of meat is placed within the sections 15 which comprise the frame, surrounds a food article on all six sides. O'Connor's device does not include a handle element comprised from parts of both sections of the frame, but rather only a single knob located at the center of one of the two frame sections. Further, the wires or pins 17 mounted within the frame are entirely straight and lack any features which would enable the pins to retain a tubular hinge therein.

Cole, U.S. Pat. No. 3,094,061, discloses another device which is primarily used for holding meat during a broiling operation. This device is difficult to manipulate, as the handle portions 33 and 34 are positioned outwardly from one side of the main food holding portions. Such a handle arrangement makes it difficult to withdraw and insert the broiler grid with an article to be toasted while at the same time maintaining the grid in its upright position. In addition, the placement of the handles outwardly from the grid results in the top of the grid being open, which necessitates great care when a food to be toasted is removed from the pop-up toaster.

The devices of Bork, as shown in U.S. Pat. Nos. 2,849,947, 2,962,957 and 3,046,870, are difficult to use and expensive to produce. In the accessory of U.S. Pat. No. 2,962,957, a basket for toasting bread is made in the form of a frame with one foraminous side wall, but it does not comprise a plurality of hinged sections which enable easy access to the food being toasted. In the other two holders disclosed by Bork, access to the food being toasted is limited by the fact that the holder consists of a frame surrounding the bread on all six sides, and can only be achieved when the two sections comprising the holder are separated. Both of these devices also include handle structures which do not facilitate removal and insertion of the article to be toasted within a pop-up toaster.

Jalbert, U.S. Pat. No. 3,308,748, discloses a toasting apparatus formed completely of wire which is designed to carry frankfurter buns and is accordingly of an irregular configuration. This apparatus is designed to shape a piece of bread into a desired form as a hot dog bun before and during toasting. It is incapable of retaining a flat article of food to be toasted, such as a muffin or a slice of bread, and prevents withdrawal of the article being toasted while the two sections of the apparatus are cradled within one another.

Barnett, U.S. Pat. No. 3,140,651, discloses a foraminous grill for use with a charcoal cooker. Grill 21 is comprised of a series of interconnected wires, but has only one handle 23 and is not formed of two hingedly connected sections which provide easy access to the article of food being toasted as the sections are designed to retain the food by pressure. The device of Dooley, U.S. Pat. No. 2,604,032, is a combination tray and door for a side opening toaster. Base 39, while sufficient to support a slice of bread in such a toaster, would be capable of holding the same when it is withdrawn from a pop-up toaster. This is due to the fact that no frame structure is provided in Dooley's tray which could surround an article of food to be toasted on four sides thereof.

Finally, Gomersall, U.S. Pat. No. 2,285,156, discloses bread carriers 53 located between heating elements 31, but these carriers are not designed as separate attachments to retain food articles being toasted, and they lack handles which would facilitate removal and insertion of such articles.

It is clear that none of these prior art devices simply and inexpensively overcome all of the problems posed by pop-up toasters. All of these devices have either complex handle mechanisms, bulky and/or relatively expensive frames and supports or are configured in such fashion as to prevent easy insertion and withdrawal of the device from a pop-up toaster. Additionally, none of the disclosed devices includes frame structure which would enable an article being toasted to be removed from the device without undue manipulation of the frame and handles.

OBJECTS OF THE INVENTION

Accordingly, it is a general object of the present invention to provide a new and improved toaster accessory to hold food while it is being toasted and to facilitate removal of the food therefrom when the toasting process is finished.

Another object of the present invention is to provide a new and improved toaster accessory to prevent burns, cuts and scratches which result when people are forced to place their fingers within the slot of a toaster to remove a piece of bread which has not "popped-up".

A further object of the present invention is to provide a new and improved toaster accessory which will prevent the destruction of heating elements, often called ribbons, which results when knives or other sharp elongated objects are inserted into a pop-up toaster in order to remove an article of food which is stuck within a slot thereof.

An additional object of the present invention is to provide a new and improved toaster accessory which will reduce electric shocks which often occur when a metallic object is inserted within the slot of a pop-up toaster.

Yet another object of the present invention is to provide a new and improved toaster accessory which will prevent food being toasted from burning and crusting when such food comes in contact with a toaster's heating element.

A still further object of the present invention is to provide a new and improved toaster accessory which will eliminate wedging of food within a pop-up toaster slot and thereby facilitate withdrawal of the food being toasted from the toaster.

Yet an additional object of the present invention is to provide a new and improved toaster accessory which will easily open to allow an article of food to be toasted to be placed within the accessory or to remove an article of food easily after it has been toasted and which will also permit such food to be removed without opening the accessory.

A still further object of the present invention is to provide a new and improved toaster accessory which will allow an article of food which has been toasted to be withdrawn from the accessory without undue manipulation of the handle or frame.

A yet additional object of the present invention is to provide a new and improved toaster accessory which will hold a wide variety of shapes and sizes of food articles which are to be toasted.

Upon further study of the specification and appended claims, further objects and advantages of this invention will become apparent to those skilled in the art.

SUMMARY OF THE INVENTION

Briefly, the above and other objects of the present invention are attained in one aspect thereof by providing a toaster accessory which includes two complementary and opposed sections connected to each other by a hinge. Each section includes a handle located at the top of the section and a support member positioned directly underneath the handle. Each section also includes means connecting the support member to the hinge which include gripping means at the portion farthest from the handle, and these gripping means are designed to grip the hinge without gripping any part of the other section. The hinge element is inserted within the gripping means of both sections so that when the complementary sections are closed in upright position they form a carrier with a top, a bottom and only two sides, which configuration permits withdrawal of the article of food from either of the two sideless portions thereof.

BRIEF DESCRIPTION OF THE DRAWINGS

The above and other objects, features and advantages of the present invention will be more fully appreciated as the same become better understood from the following detailed description when considered in connection with the accompanying drawings, in which like reference characters designate like or corresponding parts throughout the several views, and wherein:

FIG. 1 is a perspective view of a toaster accessory in accordance with the present invention showing its cooperative parts in open position;

FIG. 2 is a perspective view of a guide wire which is part of the toaster accessory of the present invention; and FIG. 3 is a cross-sectional view of a toaster accessory in accordance with the present invention in its closed upright position which is inserted within one slot of a pop-up toaster.

DETAILED DESCRIPTION

Referring now to the drawings and more particularly to FIG. 1 thereof, the toaster accessory of the present invention is generally indicated by reference character 1 and includes two complementary and opposed sections, 2 and 3, which are identical in configuration but are formed as mirror images of one another. Each section includes a generally L-shaped handle portion 10 which is formed of bakelite or other heat resistant material in order to enable the accessory to be withdrawn from a toaster without burning or shocking the consumer. Each handle portion 10 includes a finger groove 11 along an outside surface thereof which extends over the entire length of each handle. These finger grooves 11 enable the consumer to better grip the accessory carrier of the instant invention by placing his fingers within the grooves. The bottom of each handle is attached to a metal support plate 12 of aluminum or steel. This plate is positioned directly underneath the handle and is attached thereto by means of screws, heat-resistant adhesive or other conventional connecting elements. Metal plate 12 is flat and lies in a plane generally parallel to the substantially flat top of the L-shaped handle. Integrally formed with and connected to the underside of the support plate 12 are two downwardly and generally perpendicularly extending metal support wires 13 at either edge thereof, each of which is attached to the plate by means of spot welding or bracing, as for example by rivets 24. These support wires 13 are generally L-shaped, with the corner of the L being formed with a slightly less than 90° angle, for a purpose to be explained hereinafter. These support wires are made of aluminum or steel, as is the support plate, and are designed to cool quicker than the heating elements of the toaster. This is in order that these wires will be cool when the toaster accessory is removed after an article of food has been toasted and has been "popped-up". The lower end of each support wire, opposed from the upper end adjacent to the support plate, includes a circular loop 21, which serves as a gripping means for hinge 4, as described hereinafter. Finally, support means 5, which include the plate 12 and support wires 13, further include support bar 20 which is integrally attached to the support wires and extends between the corners 22 of the generally L-shaped support wires to strengthen the lower end of each section.

A plurality of metal guide wires 16 are formed of stainless steel, spring steel, aluminum or other suitable metal, as are the metal support wires 13, support plate 12, and hinge 4, and are located intermediate the two metal support wires in a position parallel to the same. Each guide wire is attached and connected at an upper end to the bottom of the support plate by spot welding or bracing at its upper end, as for example by rivets 24, and each has a circular loop 23 at its opposed lower end which is similar in structure and function to each circular loop 21 in order to grip and fixedly retain the hinge 4. The guide wires are L-shaped, just as the support wires are, and the angle between the two sections of the L is the same as that of the support wires, for a reason to be explained hereinafter.

Hinge 4 is comprised of several elements and is inserted within, gripped and retained by circular loops 21 and 23. The hinge includes a hollow, cylindrical, tubular member 14 which is made of aluminum, steel or other suitable metal and which has its outer periphery directly engaged by the circular loops. A metal pin 15 can be inserted within tube 14 if desired in order to strengthen and reinforce the hinge 4 located between the two sections. It is noted that the gripping elements of each respective section do not grip the opposed section, but are instead situated adjacent the respective loop of the opposed section in order to grip and retain only the hinge.

As can best be seen in FIG. 2, guide wires 16 (as well as support wires 13), while being generally L-shaped, have an angle alpha between the sections of the L which is less than 90°. This is so that when the two sections are hinged together by placing circular loops 21 and 23 around hinge 4, and the entire accessory is placed within slot 19 of pop-up toaster 17, the bottom of the accessory will be in the form of a generally inverted V, and will conform to the shape of the bottom of the typical pop-up toaster slot. This will allow the accessory to be stably supported when the article of food is being toasted.

With respect to FIG. 3, the toaster accessory is seen in its closed and upright position as inserted within pop-up toaster 17. This figure best illustrates the dimensional relationships of the toaster accessory with respect to the pop-up toaster. The width of the accessory, as measured between opposed guide or support wires when in upright position, is shown by $D_1$. Ideally this distance will be $\frac{5}{8}''$ which is less than the 6/8" width of the conventional pop-up toaster slot. The height of both guide wires 16 and support wires 13 is shown in the illustration by $D_2$. This height must be sufficient to provide a clearance distance $D_3$, ideally $\frac{1}{8}''$, between the underside of plate 12 and the upper surface 18 of the toaster when the article is being toasted and the accessory is in its lowest position. This will insure that the heat resistant handle will avoid contact with the toaster when its heating elements are hot. Generally the height $D_2$ will be $5\frac{1}{4}''$, as the height of the typical pop-up toaster slot is approximately $5\frac{1}{8}''$.

Looking at FIG. 1, it is noted that the length of the accessory is represented by $D_4$. Ideally this distance is 5", and will be less than the length of the slot of the typical pop-up toaster. This will provide clearance for the accessory within the slot of the toaster and will facilitate withdrawal and insertion of the accessory within the slot. Further, the fact that the accessory has only a bottom, a top and two spaced apart sides surrounding the article of food to be toasted, as shown in FIGS. 1 and 3, ensures that the food can be removed easily from either of the two openings located between the sides when the accessory is in its upright position. Additionally, an article of food can be toasted which has an irregular configuration or a length greater than the length $D_4$ of the accessory, as the food may extend beyond the handle and the support wires. This is possible due to the fact that no heating elements are located at the short ends of the slot in a pop-up toaster, and there is no chance that any food article would be burned or crusted along its ends.

The steps involved in using the toaster accessory of the present invention are as follows: first, an article of food to be toasted is placed within the accessory when the accessory is in the open position shown in FIG. 1; second, the accessory is closed around the article of food, handles 1 are gripped, and the accessory is inserted into the toaster at a position shown by the dotted line in FIG. 3; third, the toaster carriage is depressed so that the toaster accessory will lie in the position as shown by the solid lines in FIG. 3 so that the article of food will then be toasted, but will be protected from contact with the heating elements of the toaster by the guide wires 16 and support wires 13; fourth, when the toasting process is finished and the accessory has "popped-up", the accessory is grasped by the handle along grooves 11 and is withdrawn from the toaster; finally, the toasted article is removed by either withdrawing it from one of the sideless portions of the accessory or by separating the two sections of the accessory and removing the article of food. It is clear that such a process is clean, simple and will reduce the possibility of burns, electric shock, destruction of the heating elements and any unsatisfactory crusting of food articles.

From the foregoing description, one skilled in the art can easily ascertain the essential characteristics of this invention and, without departing from the spirit and scope thereof, can make various changes and modifications of the invention to adopt it to various usages and conditions.

What is claimed is:

1. An accessory for holding bread, muffins and similar food articles during the toasting process in a conventional pop-up toaster, said accessory comprising:
    (a) two complementary and opposed sections which are mirror images connected to one another at a lower end thereof, each of said complementary sections including:
        (1) a handle located on top of said section;
        (2) means for supporting said handle, said supporting means being positioned directly underneath said handle; and
        (3) means connecting the supporting means to the hinge, said connecting means including means for gripping said hinge without gripping any part of the other section; and
    (b) a hinge connecting said two sections to each other, said hinge being inserted within the gripping means of each of the sections so that when said sections are hinged in a closed and upright position, said handles, said connecting means and said hinge means form a carrier with only a top, a bottom and two sides, thereby permitting the article of food being toasted to be withdrawn from the accessory from between said two sides.

2. An accessory according to claim 1, wherein said supporting means comprises:
    (c) a plate connected to the bottom of said handle;
    (d) a plurality of support wires integrally connected to said plate and extending downwardly and perpendicularly therefrom; and
    (e) a support bar integrally attached to said support wires.

3. An accessory according to claim 2, wherein said support wires are generally L-shaped and include means at the bottom thereof for gripping said hinge.

4. An accessory according to claim 1, wherein said connecting means comprise a plurality of guide wires which are attached at an upper end to said support means and which extend downwardly therefrom.

5. An accessory according to claim 4, wherein said guide wires are generally L-shaped, and said gripping means comprise circular loops located at the other end of said guide wires, each of said circular loops being capable of fixedly retaining said hinge.

6. An accessory according to claim 1, wherein said handle is formed from heat resistant material, a groove is formed along an outside surface of the handle, said groove designed to facilitate gripping of said accessory.

7. An accessory according to claim 6, wherein said handle is generally L-shaped.

8. An accessory according to claim 1, wherein said hinge includes a tubular, hollow, cylindrical member inserted within and retained by the gripping means of each section.

9. An accessory according to claim 8, wherein said hinge means also includes a metal pin inserted within said hollow member.

10. An accessory according to claim 1, wherein said connecting means, said hinge and said support means are all formed of steel, aluminum or similar metal.

11. An accessory for toasting bread, muffins and similar food in a pop-up toaster, said accessory comprising:
   (a) Two complementary and opposed sections which are mirror images connected to one another at a lower end thereof, each of said complementary sections including:
      (1) a generally L-shaped handle formed of heat resistant material located on top of said section, said handle having a groove along an outside surface thereof to facilitate insertion and removal of the accessory within one slot of a pop-up toaster;
      (2) a metal support plate attached to the bottom of said generally L-shaped handle;
      (3) two generally L-shaped metal support wires, each integrally connected to an opposed edge of the support plate and extending downwardly and generally perpendicularly therefrom, with the bottom end of each of the support wires including a circular loop to grip said hinge;
      (4) a support bar integrally attached to said support wires at a lower end thereof to strengthen said lower end;
      (5) a plurality of generally L-shaped metal guide wires located intermediate of said support wires, said guide wires attached at their respective upper ends to said support plate and said guide wires including circular loops at their opposed lower ends to retain said hinge; and
   (b) a metal hinge inserted within said circular loops of said guide wires and of said support wires, said hinge including:
      (1) a hollow cylindrical tubular member which is inserted within and retained by said circular loops; and
      (2) an inner metal pin inserted within said tubular member.

* * * * *

UNITED STATES PATENT OFFICE
CERTIFICATE OF CORRECTION

PATENT NO. : 4,184,419
DATED : January 22, 1980
INVENTOR(S) : Raymon Ponte

It is certified that error appears in the above-identified patent and that said Letters Patent are hereby corrected as shown below:

Under the title, REFERENCES CITED U.S. PATENT DOCUMENTS, the first reference should read:

3,096,706       7/1963       Cardwell...................... 99/402

Signed and Sealed this

Seventeenth Day of June 1980

[SEAL]

Attest:

SIDNEY A. DIAMOND

Attesting Officer        Commissioner of Patents and Trademarks